INVENTORS
Richard FRIEDRICH
Siegfried MELCHIOR

INVENTORS
Richard FRIEDRICH
Siegfried MELCHIOR

United States Patent Office 3,486,661
Patented Dec. 30, 1969

3,486,661
DEVICE FOR DISCHARGING LIQUID AND PASTY SUBSTANCES UNDER PRESSURE
Richard Friedrich, Dauner Strasse 6, Kelberg, Germany, and Siegfried Melchior, Hauptstrasse 117, Ollheim, Germany
Filed Dec. 22, 1967, Ser. No. 692,979
Claims priority, application Germany, Dec. 24, 1966, F 51,085
Int. Cl. B65d 35/21, 47/10
U.S. Cl. 222—95        6 Claims

ABSTRACT OF THE DISCLOSURE

The invention relates to a device for discharging liquid and pasty substances under pressure, which device essentially comprises an outer container and an inner container made from resilient material and arranged within the outer container and whose upper rim is retained within the rim of the outer container, and which device comprises a discharge valve arranged in the outer container lid and communicating with the inside of the inner container, and in which device the container base is provided with a closable aperture for introducing pressure gas and in which device the inner container is made from soft aluminium, and a stay piece and/or a perforated discharged tube guided through the container opening is arranged within the inner container.

---

Figure 1:
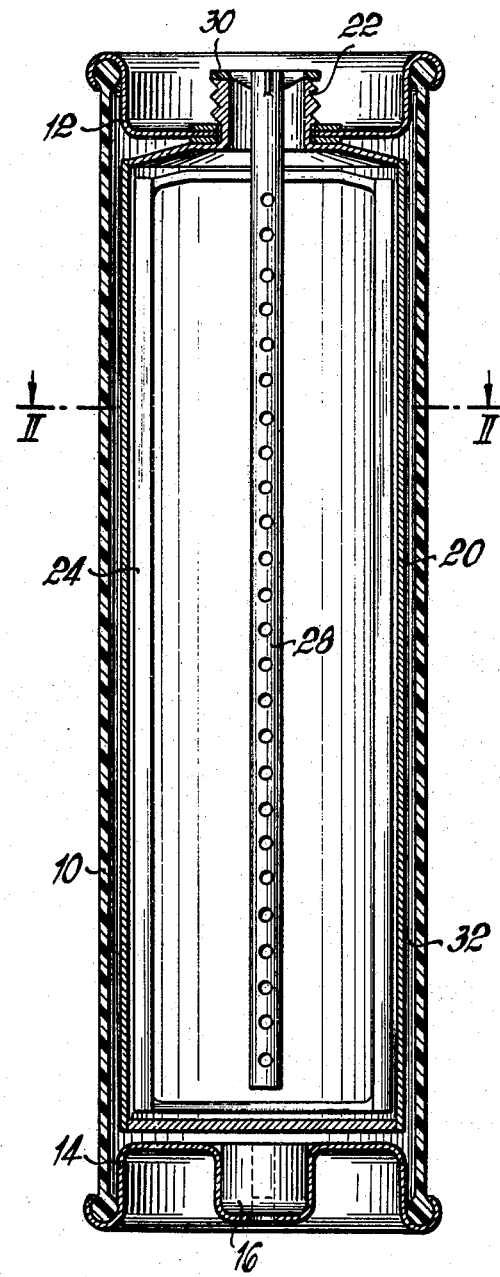

The invention relates to a device for discharging liquid and pasty substances under pressure, which device essentially comprises an outer container and an inner container made from resilient material and arranged within the outer container and whose upper rim is retained within the rim of the outer container, and which device comprises a discharge valve arranged on the outer container lid and communicating with the inside of the inner container, and in which device the container base is provided with a closable aperture for introducing pressure gas.

The subject of the invention comes within the scope of the aerosol art. Nowadays, an "aerosol" is understood to be a combination of a product and a propellent located under pressure in a suitable container and forced out and atomized by the high vapour pressure when a valve provided on the container is opened. Examples of such products are cosmetics of the most varied kind, pharmaceutical preparations, many domestic products, waxes, dyes, paints, deodorants, preparations for motor vehicle care, and the like. Containers are known in which the combination of product and propellent is contained in one container. Containers having two separate chambers are known in which the product is contained in an inner chamber made from flexible material, an outer chamber being formed around the inner chamber and containing the propellent. This propellent exerts pressure on the inner chamber, so that the product is propelled from the valve when the valve is opened.

However, it has been hitherto impossible to use the aerosol technique for dispensing foodstuffs, pharmaceutical products and cosmetics even by means of the above-mentioned twin-chamber containers in which the propellent gas and the product are contained in separate containers. For the purpose of dispensing foodstuffs, pharmaceutical preparations and cosmetics, not even traces of the propellent gas (generally containing fluoride) must under any circumstances enter the product to be sprayed. However, despite innumerable experiments, there has hitherto been no success in providing an inner container whose wall was absolutely impervious to propellent gas. The complete separation of the propellent or propellent gas and the product in the interior of the container is also necessary when the product is to be used at a place where there is the danger of explosion, since the propellents are usually explosive.

Also, the valves hitherto used in aerosol technology are not satisfactory. The product that has emerged from the discharge valve frequently cannot be removed and used in its entirety, despite complicated construction, so that residues remain on the other side of the closure plane in the discharge valve where they can dry and decay. Further, in the known discharge valves, the product in the valve comes into contact with the closing spring, so that corrosion can occur and, according to the nature of the product, dangerous combinations can arise by the product coming into contact with the metal of the closing spring.

The invention is to eliminate these disadvantages and provide a device for dispensing liquid and pasty substances under pressure, in which device there is complete separation between the propellent and the product, the discharge valve of the device being constructed so that the closure plane is located at the outermost end of the valve, so that after the valve has been closed virtually no residue to the product which has emerged can accumulate and dry on the other side of the actual valve closure and impair the further use of the valve. Also, in the discharge valve of the device constructed in accordance with the invention, the product is not to come into contact with the closing spring. The device constructed in accordance with the invention is to render possible the thoroughly hygienic discharge of the product, even if it is in use for a long time.

In accordance with the invention, these objects are achieved in that the inner container is made from soft aluminum, and that a stay piece and a perforated discharge tube guided through the container opening are arranged within the inner container.

It has been proved that the manufacturing of the inner container from soft aluminum provides absolute separation between the propellent and the product, the stay piece and the perforated discharge tube ensuring that the inner container can be completely emptied by the pressure of the propellent.

The invention further provides for the valve body of the discharge valve to be a cylindrical valve core tube attachable to the container opening of the device, which cylindrical core tube has a head widening conically towards the end and is provided in the region of this head with radial passages leading from the bore of the tube to the outside of the head, the invention also providing for the valve element of the discharge valve to be an annular operating element arranged around the tube and whose cylindrical centre bore has a funnel-shaped recess on the conical head, and for a closing spring to be arranged outside the tube between the annular operating element and the lid of the device or an abutment.

Further objects, features and advantages of the invention are disclosed in the following specification of an embodiment with reference to the accompanying drawings.

Figure 2:
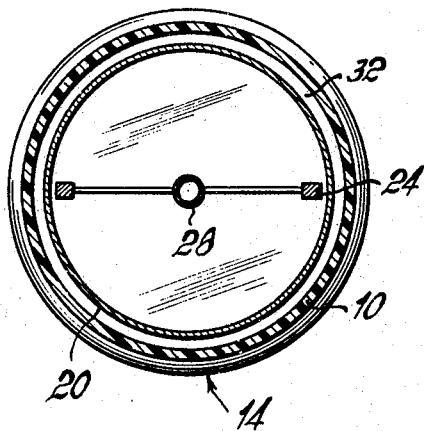
Figure 3:
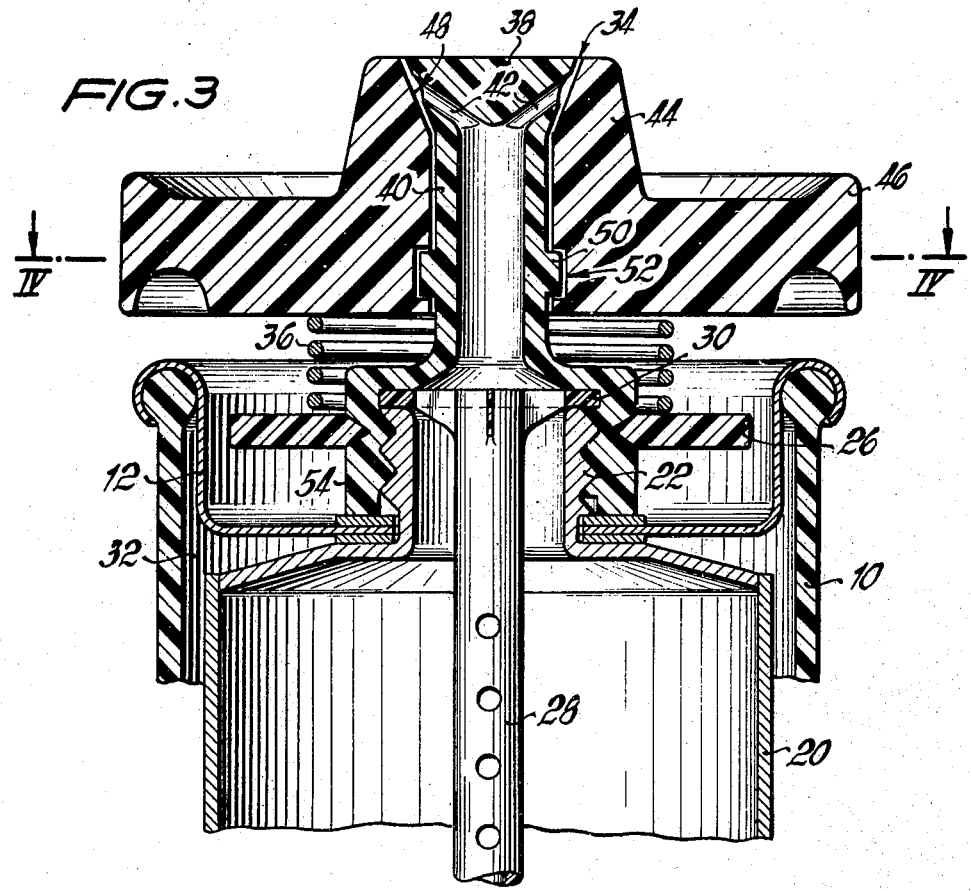
Figure 4:
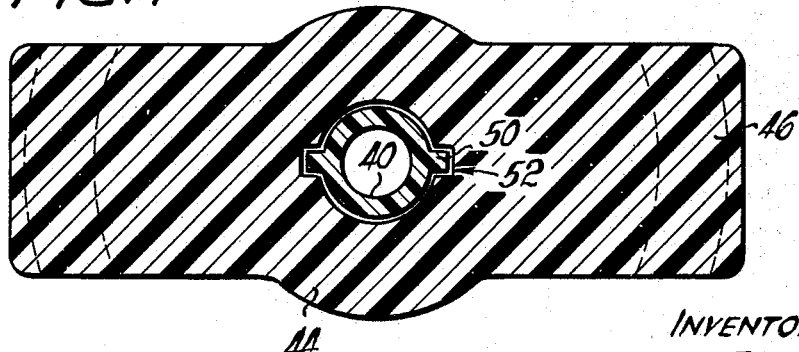

In the drawings:
FIG. 1 is a schematic representation of a vertical cross section through an embodiment of the device constructed in accordance with the invention, the discharge valve not being illustrated in this figure.
FIG. 2 is a section taken on the line II—II in FIG. 1.
FIG. 3 is a vertical cross section through the discharge valve relating to the device illustrated in FIG. 1, drawn to a larger scale.
FIG. 4 is a section taken on the line IV—IV in FIG. 3.
FIGURES 1 and 2 are referred to in the first instance. The outer container 10 of the device comprises a hollow cylindrical body made from sheet metal, aluminum, plastics material, or the like. The lower end of the outer container 10 is sealed by a lid 14 whose rim is rolled around the rim of the outer container 10 and in which an aerosol valve 16 is arranged through which the propellent is filled.

The upper end of the outer container 10 is sealed by a lid 12 whose rim is rolled around the rim of the outer container 10 and which is provided with a centre opening.

An inner container 20 made from soft aluminum or a similar soft metal is arranged in the interior of the outer container 10. The base and the lid of the inner container 20 can be soldered, welded, glued or screwed to the container wall. The lid of the inner container 20 has a neck 22 provided with an external thread and passing through the centre opening of the lid 12 of the outer container 10 and tightly and sealingly secured in the centre opening (see also FIG. 3).

The space 32 between the outer container 10 and the inner container 20 is filled through the aerosol valve 16 with a propellent endeavouring to compress the inner container 20.

A stay piece 24 comprising a frame-like stirrup is located in the interior of the inner container 20 accommodating the actual product. The stay piece 24 ensures that the inner container 20 is compressed flat under the action of the propellent. Alternatively, the same effect is achieved if a longitudinally extending reinforcing strip or reinforcing ridge is incorporated on each of two opposite sides of the inner container 20.

A perforated discharge tube 28 to which the stay piece 24 may be connected passes through the inner container 20 in the longitudinal direction. The perforated discharge tube 28 comprises a rod having external openings which are to ensure that the inner container 20 is completely emptied even when it is compressed in the centre by the propellent. Thus, in the event of the inner container 20 being compressed in this manner, the perforated discharge tube 28 prevents the occurrence of a blind closure preventing a part of the product located in the inner container passing to the neck 22. Thus, the openings of the perforated discharge tube 28 ensure that there is always a passage to the neck 22 for the product contained in the inner container. A securing flange 30 resting on the top of the neck 22 and having openings is provided at the upper end of the perforated discharge tube 28.

The inner container 20 provided with the stay piece 24 and the perforated discharge tube 28 is secured in the lid 12 during manufacture and the entire arrangement inserted into the interior of the outer container 10, whereupon the lid 12 is connected to the outer container 10. The inner container 20 may then be filled with the product through the neck 22. After the valve still to be described has been mounted, the propellent space 32 between the outer container 10 and the inner container 20 is filled with propellent through the aerosol valve 16. The inner container 20 is uniformly compressed by the expansion pressure of the propellent in the space 32. When the discharge valve still to be described is opened, the product emerges from the valve under pressure.

The discharge valve illustrated in detail in FIGURES 3 and 4 essentially comprises a valve core tube 40 of cylindrical shape whose end is provided with a conical head 38 widening towards the end. The valve core tube 40 is secured to a threaded cap 54 whose internal thread fits the external thread of the threaded neck 22 of the inner container 20. The tube 40 can be screwed, welded, or glued to the cap 54, or connected thereto in any other manner.

The securing flange 30 of the perforated discharge tube 28 is pressed against the top of the threaded neck 22 by the cap 54.

Radial outlet passages 42 are formed in the head 38 of the valve core tube 40 and lead obliquely outwardly from the tube bore to the outside of the conical head 38.

An annular operating element 44 is arranged around the valve core tube 40 and its cylindrical centre bore embraces the tube 40. A funnel-shaped recess 48 adapted to the shape of the head 38 is formed at the upper end of the annular operating element 44. The annular operating element 44 is provided also with laterally projecting finger rests 46.

A collar 26 is secured to the exterior of the cap 54. A closing spring 36 is arranged between the collar 26 and the bottom of the annular body 44.

With the exception of the closing spring 36 all the parts of the valve are made preferably from plastics material which is not affected by the product contained in the inner container 20.

In order to assemble the valve, the annular operating element 44 is first of all slipped on to the tube 40 and then the closing spring 36 is applied against the bottom of the annular operating element 44, whereupon the tube 40 is connected to the cap 54. To slip the element 44 over the tube 40, the element 44 may be heat expanded and the tube 40 cold treated or the element 44 may comprise two parts which are assembled around the tube 40. The spring 36 then urges the annular operating element 44 into the closed position in which the conical head 38 fits snugly into the funnel-shaped recess 48. The entire valve is now screwed on to the threaded neck 22.

In accordance with a preferred embodiment of the invention, shearing ribs 50 engaging into appropriate grooves 52 in the annular operating element 44 are arranged on the exterior of the tube 40. When a valve of this construction is screwed on to the threaded neck 22, and the annular operating element 44 is turned, the shearing ribs 50 are sheared as soon as the cap 54 is screwed sufficiently tightly on to the neck 22. The fixed connection between the annular operating element 44 and the tube 40 is eliminated when the ribs 50 are sheared, so that after the valve has been screwed on to the threaded neck 22 it cannot be unscrewed again.

In the normal state, the spring 36 presses the annular operating element 44 upwardly into the closed position. If the valve is to be opened, two fingers are pressed on to the finger rests 46, so that the annular operating element 44 is moved downwardly. The outlets of the radial passages 42 are thereby opened, so that the product can emerge from the inner container 20 through the radial passages. If the annular operating element 44 is released in order to close the valve, the annular operating element is driven upwardly into the closed position by the closing spring, the inner edge 34 of the funnel-shaped recess 48 exercising a wiping action on the outside of the head 38, so that no residue of the product remains within the valve between the head 38 and the funnel-shaped recess 48 after the valve has been closed. It will be seen that the actual closing plane of the valve constructed in accordance with the invention is located immediately at the outlet end, so that after the actuation of the valve no residues of the product which could dry or decay remain in any dead spaces. The product does not come into contact with the closing spring 36. The valve "cleans" itself by virtue of the conical construction of the head 38 and the funnel-shaped recess 48.

Of course, the invention is not confined to the details of the illustrated embodiment. A large variety of modifications are possible within the scope of expert ability, without the scope of the present invention being abandoned.

What we claim is:

1. A device for discharging liquid and pasty substances under pressure comprising:
   an outer container having an upper rim and a lid mounted on said rim;
   an inner container consisting of a soft metal and arranged within said outer container;
   said inner container having a threaded annular flange retainer within a central aperture formed within said lid;

a discharge valve threadedly mounted on said flange of said inner container;

a closable aperture formed on a bottom end of said outer container for introducing pressurized gas;

a hollow rod having a plurality of radial openings extending substantially along the entire length thereof, said rod being axially disposed within said inner container and projecting through a central passageway formed by said flange of said inner container;

a stay piece disposed within said inner container for insuring that said inner container is forced into a flat configuration when acted upon by the pressurized gas disposed between the walls of said inner container and said outer container;

said discharge valve including a cylindrical hollow core formed with shearable ribs on the exterior surface thereof, said core being threadedly mounted on the threads of said annular flange of said inner container, and said core being provided with a head portion widening toward an upper end thereof, said core having a central bore communicating with an axial passage formed in said hollow rod and having generally radially extending passages leading from said central bore of said core to the exterior of said head portion;

an annular operating element positioned around said core, said opearting element formed with an internal generally symmetrical surface defining a central bore and having a recess with an inner surface corresponding to the outer surface of said head portion for receiving said head portion, said internal symmetrical surface being formed with recesses for retaining said ribs formed on the external surface of said core so as to provide a shearable connection between said core and said operating element;

spring means arranged outside said symmetrical hollow core and biased between said operating element and an abutment provided adjacent a lower portion of said core; and whereby said discharge valve is armed by turning said operating element and said core down on the threads formed on said annular flange until said ribs shear so as to release the connection between said core and said operating element.

2. A device according to claim 1 wherein said inner container consists of soft aluminum; said stay piece is of a stirrup configuration; and said head portion of said symmetrical hollow core is of a conical configuration.

3. A device according to claim 1 wherein said radial passageways formed in said head portion extend obliquely toward the upper end thereof.

4. A device according to claim 1 wherein said operating element is formed with finger rests.

5. A device according to claim 1 wherein said spring means comprises a compressed helical spring.

6. A device according to claim 1 wherein an upper annular edge of said operating element defining the widest portion of said recess cooperates with said head portion of said symmetrical hollow core to wipe the space defined between said head portion and said recess clear of discharge material when said operating element is released so as to close said discharge valve.

References Cited

UNITED STATES PATENTS

| | | | |
|---|---|---|---|
| 1,086,532 | 2/1914 | Huss | 222—95 |
| 1,628,834 | 5/1927 | Frank | 222—95 |
| 1,873,817 | 8/1932 | Buddenhagen | 222—95 X |
| 2,671,578 | 3/1954 | McBean | 222—95 |
| 3,151,777 | 10/1964 | Rooney | 222—541 X |
| 3,278,094 | 10/1966 | Perry | 222—514 X |
| 3,416,709 | 12/1968 | Schultz et al. | 222—94 |

ROBERT B. REEVES, Primary Examiner

F. R. HANDREN, Assistant Examiner

U.S. Cl. X.R.

222—514, 541